United States Patent [19]
Moore

[11] 3,740,813
[45] June 26, 1973

[54] METHOD OF MAKING A CONNECTOR TEE FOR PRESSURE PIPE LINES

[76] Inventor: Charles H. Moore, 645 Matanzas Court, Fort Myers Beach, Fla. 33931

[22] Filed: Sept. 21, 1972

[21] Appl. No.: 291,040

Related U.S. Application Data

[63] Continuation-in-part of Ser. No. 142,744, May 12, 1971, which is a continuation-in-part of Ser. No. 720,658, April 11, 1968, abandoned.

[52] U.S. Cl. .................. 29/157 T, 72/364, 72/368, 72/370
[51] Int. Cl... B21d 53/00, B21k 29/00, B23p 15/00
[58] Field of Search ..................... 29/157 R, 157 T; 72/69, 203, 324, 342, 364, 365, 367, 368, 370, 377; 285/156

[56] References Cited
UNITED STATES PATENTS

| | | | |
|---|---|---|---|
| 2,165,454 | 7/1939 | Cornell | 29/157 T |
| 2,292,799 | 8/1942 | Romann et al. | 29/157 T |
| 2,829,431 | 4/1958 | Brauchler | 72/69 |
| 3,290,936 | 12/1966 | Harvey | 72/203 |

Primary Examiner—Charles W. Lanham
Assistant Examiner—E. M. Combs
Attorney—Robert U. Geib, Jr.

[57] ABSTRACT

Metallic connector Tees for pressure pipes of the larger sizes and wall-thicknesses, which cannot be efficiently and economically made from pipe, and which heretofore have been made by relatively expensive block forging methods, are made by heating a solid metal work-piece of round cross section and appropriate size to forging temperature; peripherally confining the heated solid metal workpiece; and hollow-punching it in axially offset relationship with respect thereto in such manner as to provide a selected wall portion which is sufficiently thick as to permit the formation of the branch pipe passages therein while still retaining sufficient metal to compensate by way of reinforcement for the weakening of the wall caused by the formation of said passages, and without reducing the thickness of the opposite portion of the wall of the work-piece below a predetermined point.

2 Claims, 7 Drawing Figures

PATENTED JUN 26 1973 3,740,813

INVENTOR
CHARLES H. MOORE

BY
ROBERT U. GEIB, JR.
ATTORNEY

PATENTED JUN 26 1973　　　　　　　　　3,740,813

INVENTOR
CHARLES H. MOORE

BY
ROBERT U. GEIB, JR.
ATTORNEY

PATENTED JUN 26 1973 3,740,813

INVENTOR
CHARLES H. MOORE

BY
ROBERT U. GEIB, JR.
ATTORNEY

METHOD OF MAKING A CONNECTOR TEE FOR PRESSURE PIPE LINES

The present application is a continuation-in-part of my present application Ser. No. 142,744, filed May 12, 1971 entitled "Method of Making a Connector Tee for Pressure Pipe Lines," which, in turn, is a continuation-in-part of my earlier filed patent application Ser. No. 720,658, filed Apr. 11, 1968 entitled "Method of Making Connector Members For High Pressure Pipes" (now abandoned).

BACKGROUND OF THE INVENTION

In the past it has been customary to make metallic connectors for smaller size pressure pipes from pipe or tubing; and in the case of the larger sizes, commencing at approximately 8-inch nominal pipe size with an accompanying wall-thickness of 0.718 inch or more, which couldn't satisfactorily be made from pipe or tube, to resort to drop forging methods.

Pipe of the sizes which previously have been difficult to form into Tee connectors and which caused resort to drop forging methods include:

Schedule 60 commencing with 18 inch Nominal Pipe Size (wall-thickness 0.750 inch)
Schedule 80(c) commencing with 14 inch Nominal Pipe Size (wall-thickness 0.750 inch) and
Schedule 100 commencing with 10 inch Nominal Pipe Size (wall-thickness 0.718 inch)
Schedule 120 commencing with 8 inch Nominal Pipe Size (wall-thickness 0.718 inch)
Schedule 140 commencing with 8 inch Nominal Pipe Size (wall-thickness 0.812 inch)
Schedule 160 commencing with 8-inch Nominal Pipe Size (wall-thickness 0.906 inch) and
Double Extra Strong commencing with 8-inch Nominal Pipe Size (wall-thickness 0.875 inch).

THE INVENTION

In order to circumvent the use of drop forging methods which are expensive to conduct, as well as having other advantages, I have discovered that metallic Tee connectors, and modified Tee connectors, for the larger size pipes for pressure pipe lines, i.e. approximately 8-inch nominal pipe size with an accompanying wall-thickness of 0.718-inch wall-thickness or greater, can satisfactorily be made by a relatively simple and inexpensive hollowing punching method provided it is carried out in a certain well-defined manner, as will appear hereinafter.

It has, of course, long been recognized that any opening made in a main pipe (or run) for a branch connection interrupts the uniformity of hoop stresses in the wall of the pipe and results in these stresses being concentrated and intensified at the edges which define the opening. These hoop stresses are directly proportional to the pressure and hydraulic diameter of the section and inversely proportional to the wall-thickness of the section.

The rules for strengthening such connections or joints are equally well-known, having been established by various codes — such as the A.S.A. code for pressure piping, the A.S.M.E. power boiler code or by such manufacturing codes as the A.S.A. Standard B-16.9.

The A.S.M.E. Boiler Code provides that the area surrounding an opening must be adequately reinforced; and defines the area of reinforcement or strengthening of an opening as confined to a rectangle which is limited in its outside diameter by two (2) times the diameter of the opening.

The other limitation as to the confinement of the area of reinforcement under the A.S.M.E. Boiler Code is two and one-half (2.5) times the thickness of the shell both above and below the opening.

These rules for the strengthening or reinforcement of the areas referred to in Tee connectors and the like are described in a number of applicant's patents, including U.S. Pat. No. 3,392,994, dated July 16, 1968 and entitled "Connector Means For Pressure Pipelines."

According to prior art practices, in the production of a pipe fitting or connector member by the block forging method and for the larger sizes referred to, a forging with a square or rectangular cross-section is first obtained; then those portions of the square or rectangular cross-section which are not essential to the shape of the desired Tee or modified Tee are cut-off or burned-off, followed by cutting or boring the forged block to provide the desired fluid passages. Besides being quite costly, this series of steps does very little toward the solution of the problem that square or rectangular billets of metal (whether of carbon steel or various alloys) are characterized by unsoundness at the center due to piping caused by impurities, occlusions, gas pockets, etc. This inherent unsoundness is, of course, caused by the differential solidification or selective freezing action of the cast ingot. The "pipes" in the center of the ingot are only slightly removed after it has been cropped and forged (by rolling, pressing or hammering) into the billet or work-piece of square or rectangular cross-section.

It has been conclusively demonstrated that even the cutting or boring steps to form the fluid passages in the block forging or billet of rectangular cross-section, as practiced in the prior art do not entirely remove the unsound metal caused by the piping during the ingot phase and this is true even if the ingot is subjected to sufficient plastic deformation to reduce its thickness by as much as one-fourth or one-third.

Among the objects of the present invention is the provision of a relatively simple and inexpensive method of making very sound fittings or connector members for large size high pressure pipes, and particularly those of Tee or modified Tee formation, which avoid the difficulties and disadvantages referred to.

Another object is to provide one-piece Tee or modified Tee connector members for large size pipes carrying fluids under high pressures which are metallurgically sounder throughout than those which are produced in conformity with prior art practices; and which, in addition, are so shaped that a portion of the metal of which they are composed is positioned so as to provide increased wall-thickness and strength (i.e. reinforcement) at areas which ordinarily are least resistant to bursting pressures.

Still another object is the provision of one-piece connector members of the type described which possess the advantages referred to, and wherein the forging is sounder and with better grain orientation.

The foregoing and other objects and advantages will be more readily understood after referring to the following description and accompanying drawings wherein like reference numerals designate like parts, and wherein.

Figure 1:
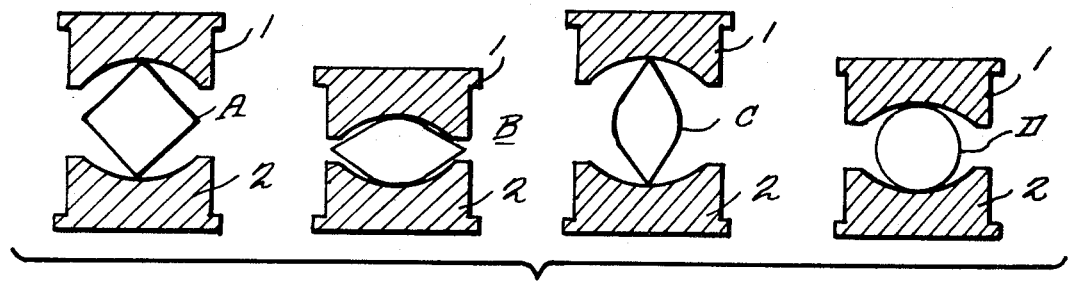
FIG. 1 is a series of bracketed schematic elevational views illustrating four rolling or forging steps which, according to the teachings of the present invention, are employed in transforming a billet of rectangular cross-section into one of round cross-section.

Referring more particularly to the drawings, in FIG. 1 the numerals 1 and 2 designate a pair of cooperating lower and upper forging dies or rolls, respectively, which are adapted to progressively transform the billet of initially rectangular cross-section into one of round cross-section, the four phases thereof being indicated on the work-piece at A, B, C and D.

As stated earlier herein the plastic deformation of the ingot (not shown) to provide the billet A of rectangular cross-section serves to close up some of the "pipes," etc., and therefore eliminate some of the unsound metal which is adjacent the center.

However, the additional plastic deformation which is caused by transforming the billet or work-piece from rectangular to round cross-section is even more beneficial in closing up "pipes," etc., and thereby further eliminating unsound metal adjacent the center.

Figure 2:
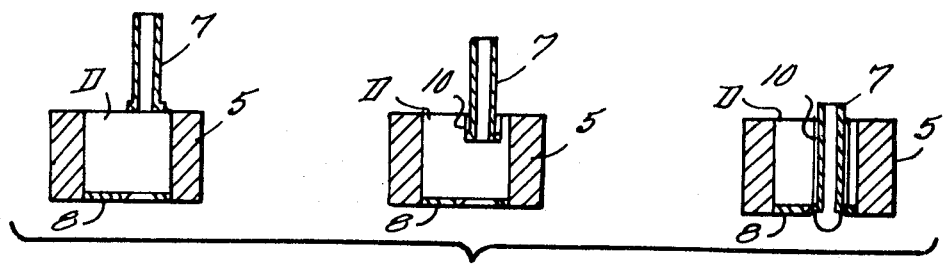
FIG. 2 is a series of bracketed schematic elevational views illustrating further treatment of the round billet as obtained by the fourth step of FIG. 1; and more specifically the punching of the round billet in such manner as to obtain a longitudinally extending but axially off-set cylindrical bore.

Now referring to FIG. 2, after the round cross-section has been obtained, the work-piece D is placed in a cylindrical die 5 and subjected to the action of a hollow punch 7 which is located and arranged against a knife block 8 to punch-out a longitudinally extending off-set cylindrical bore 10.

As schematically represented in the three stages of FIG. 2, the punch 7 is moved downwardly and longitudinally through the round billet D in the axially off-set relationship shown, the resulting slug or core E being utilized as scrap in succeeding melting and casting operations or as stock for smaller pipe connectors.

It will, of course, be understood by those skilled in the art that the instrumentalities of FIG. 1, which transform the billet from rectangular to round cross-section, and the instrumentalities of FIG. 2, which accomplish the axially off-set punching operation, may be entirely conventional in form; and as such form no part of the present invention.

Figure 3:
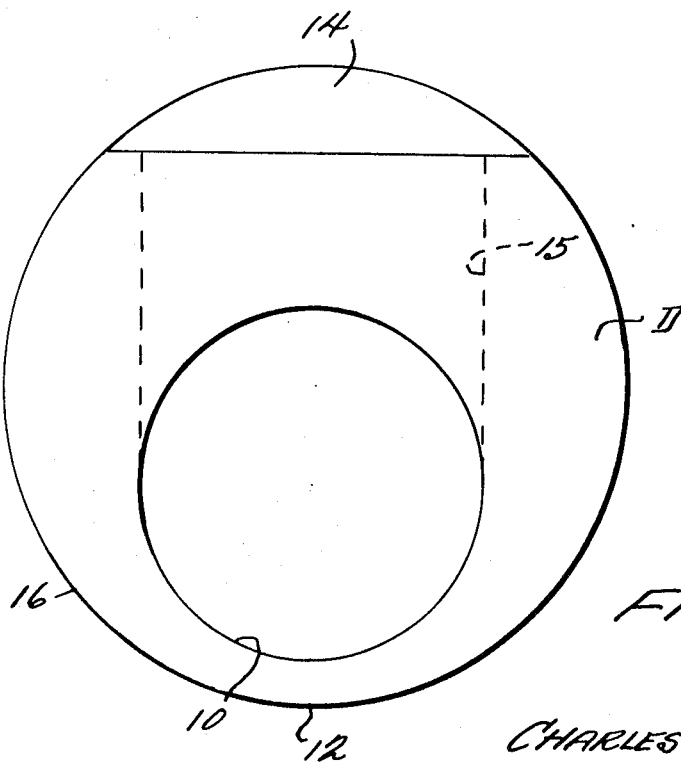
FIG. 3 is an end elevational view illustrating the round billet with its longitudinally extending, axially off-set cylindrical bore immediately prior to the formation therein of the branch pipe passage of a Tee fitting which extends right-angularly with respect to, and communicates with, the longitudinally extending, axially off-set cylindrical bore which forms the line pipe portion of the Tee.

Referring now to FIG. 3, the axially off-set punched out portion 10 of the round billet or work-piece D which is provided by the removal of the slug or core E shown in FIG. 2, is of the same, or substantially the same, diameter as the inside diameter of the line pipes which are to be connected thereto.

The thinnest portion of the wall of the axially off-set cylindrical bore 10 of the work-piece D is indicated at 12; and the diametrically opposite, and thickest, portion at 14, the latter providing an ideal mass of metal for the reinforcement of that portion thereof wherein there is formed branch passageway 15 which is to communicate with the bore 10.

This distribution of metal, as described immediately hereinbefore provides intermediate walls 16 which, while thinner than the thickest portion 14, are materially thicker than the thinnest portion 12 of the wall.

Considerable care must be taken to insure the positioning of the hollow-punch 7 in such manner that not only will there be adequate reinforcement at the thickest portion 14 to compensate for the weaknesses imparted by the removal of the metal to provide the passageway 15, but also to prevent excessive reduction in the thinnest portion 12.

In the case of conventional Tee connector members, it is the side areas which are most likely to fail under bursting pressures; whereas in Tee connector members which embody the teachings of the present invention increased resistance is provided by the increased wall-thickness at all points, even at the portion 12 which is itself not less than three-fourths inch thicker than the minimum required wall thickness as calculated by accepted methods.

Immediately following is a specific example of a forging which has been formed in accordance with the teachings of the invention:

EXAMPLE

Dimensions of Off-Center Punched Cylindrical Forging

Figure 4:
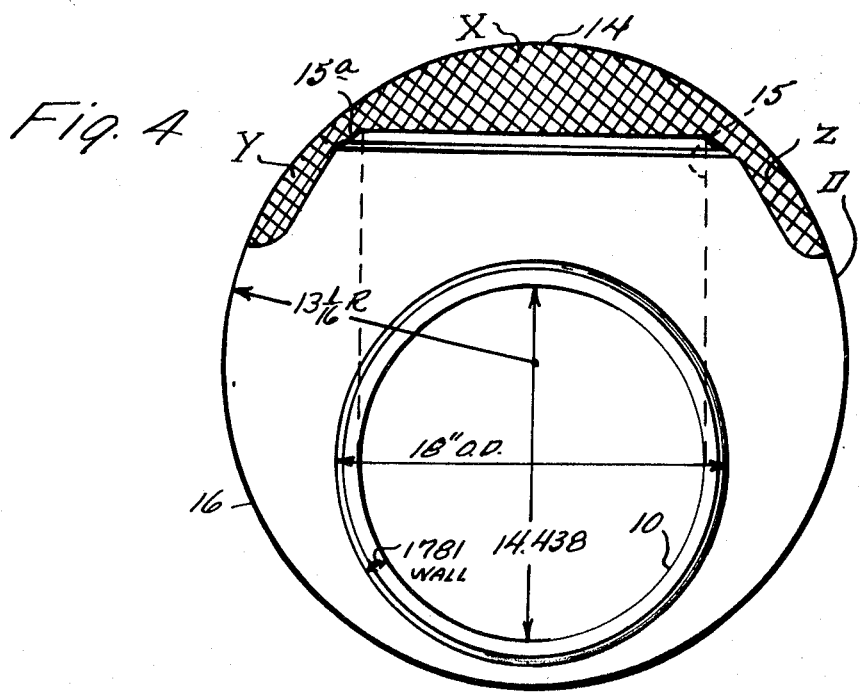
FIG. 4 is an end elevational view of the completed Tee fitting which comprises the two line pipe connections and the single branch pipe connection.
Figure 5:
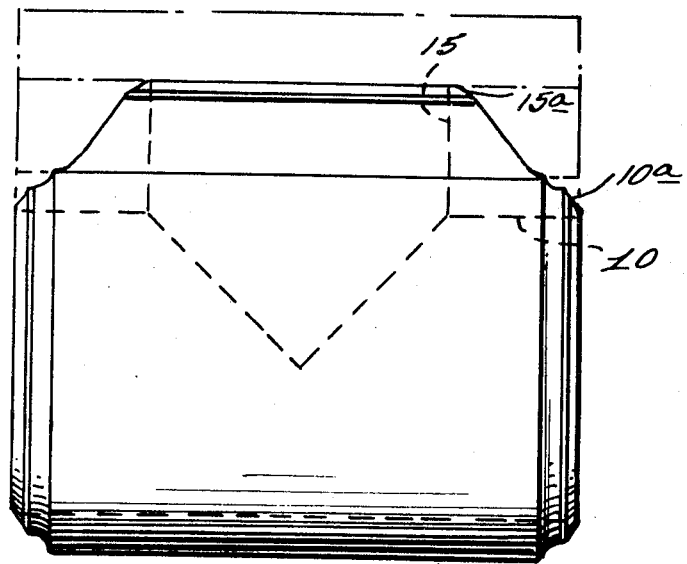
FIG. 5 is a side elevational view of the showing of FIG. 4.

Weight - 4,120 Pounds
Width - 26 ⅛ inches
Depth - 26 ⅛ inches
Length - 27 inches
Diameter of Off-Center Cylindrical bore — 14.438 inches With the removal from the off-center punched cylindrical forging of the mass of metal at X, Y and Z as required to shape-up the Tee connector, the following dimensions will be obtained:

End-to-end along line pipe passageways — 27 inches
End of branch-pipe passageway to axis of line pipe passageway — 13.5 inches
Diameter of line pipe passageway — 14.438 inches
Diameter of branch pipe passageway — 14.438 inches The outer ends of the two line pipe connections and the outer end of the single branch pipe connection are provided with the usual bevelled portions 10a and 15a, respectively, as shown in FIGS. 4 and 5.

The Tee connector member made in the manner described, and possessing the dimensional characteristics set forth herein, is intended for connecting standard Schedule 160 pipe which has an outside diameter of 18 inches, an inside diameter of 14.438 inches, and accordingly a wall-thickness of 1.781 inches. It will be readily understood by those skilled in the art that the invention is not limited to a full size Tee as described since it is equally applicable to reducing Tees, etc.

Figure 6:
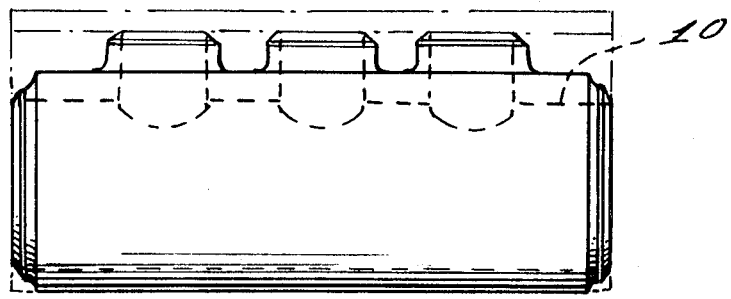
FIG. 6 is a side elevational view illustrating a modified form of the invention which comprises a header or common manifold communicating with a series of branch pipes.
Figure 7:
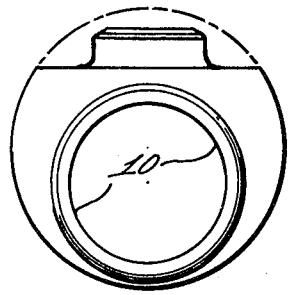
FIG. 7 is an end elevational view of the showing of FIG. 6.

Referring to FIGS. 6 and 7, a modified form of the invention also contemplates a header comprising an elongated work-piece of round cross-section with a longitudinally extending axially off-set bore which may be identical with the bore 10 as previously described, and which forms a manifold; together with a series of spaced areas of greater metal distribution each of which is apertured to provide a branch passage extending at right-angles to, and communicating with, the elongated off-set bore.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. The method of making a metallic connector Tee for connecting pressure pipes of approximately 8-inch Nominal Pipe Size and a wall-thickness of at least 0.718 inch. which consists essentially of
    a. heating a solid metal work-piece of round cross-section and appropriate size to forging temperature;
    b. peripherally confining the so-heated solid metal work-piece throughout substantially its entire length;
    c. positioning a single, round, hollow punch longitudinally of said work-piece but in axially off-set relationship with respect thereto while said work-piece is heated and peripherally confined in the manners aforesaid;
    d. moving said single, round, axially offset, hollow punch longitudinally through said work-piece while it is heated and peripherally confined in the manners set forth hereinbefore, to thereby obtain an axially off-set cylindrical bore of such size and shape as to constitute the line pipe passage of the connector Tee and thereafter
    e. making a transversely extending opening through the wall of that portion of said work-piece which possesses the greater cross-sectional area, to thereby form a re-inforced branch pipe opening which extends at right-angles to, and communicates with, the line pipe passage of the connector Tee,
    f. the axially offset, single, round, hollow-punch being so positioned with respect to the longitudinal axis of the work-piece throughout its movement with respect thereto as to assure the provision around the subsequently formed branch pipe passage of sufficient metal to compensate by way of reinforcement for the weakening of the wall of the work-piece caused by the formation of said branch pipe passage and without reducing the thickness of the opposite portion of the wall of the work-piece below the bursting pressure of the connector Tee.

2. The method of claim 1 wherein the solid metal work-piece of round cross-section is obtained by forging the same from a solid work-piece of rectangular cross-section.

* * * * *